US006902156B2

(12) United States Patent  
Muramatsu et al.

(10) Patent No.: US 6,902,156 B2
(45) Date of Patent: Jun. 7, 2005

(54) PNEUMATICALLY OPERATED ACTIVE VIBRATION DAMPING DEVICE

(75) Inventors: Atsushi Muramatsu, Komaki (JP); Kazuhiko Kato, Komaki (JP); Motohiro Hatano, Kounan (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 09/991,133

(22) Filed: Nov. 16, 2001

(65) Prior Publication Data

US 2002/0066985 A1 Jun. 6, 2002

(30) Foreign Application Priority Data

Dec. 5, 2000 (JP) ........................................ 2000-370401

(51) Int. Cl.[7] ................................................. F16M 9/00
(52) U.S. Cl. ................................................. 267/140.15
(58) Field of Search ........................ 267/140.11–140.15; 248/562, 636

(56) References Cited

U.S. PATENT DOCUMENTS

| | | | | |
|---|---|---|---|---|
| 4,693,455 | A | | 9/1987 | Andra |
| 5,092,566 | A | | 3/1992 | Freudenberg |
| 5,170,998 | A | * | 12/1992 | Muramatsu ............ 267/140.13 |
| 5,393,041 | A | * | 2/1995 | Takano et al. ......... 267/140.14 |
| 6,017,024 | A | | 1/2000 | Muramatsu et al. |
| 6,055,317 | A | * | 4/2000 | Muramatsu et al. ....... 381/71.4 |
| 6,082,717 | A | | 7/2000 | Nanno |
| 6,082,718 | A | | 7/2000 | Yamada et al. |
| 6,120,012 | A | | 9/2000 | Shibata et al. |
| 6,145,802 | A | | 11/2000 | Nakagaki et al. ........... 248/638 |
| 6,158,415 | A | * | 12/2000 | Ichikawa et al. ...... 123/339.23 |
| 6,176,477 | B1 | | 1/2001 | Takeo et al. |
| 6,224,045 | B1 | * | 5/2001 | Muramatsu et al. ... 267/140.13 |
| 6,254,069 | B1 | * | 7/2001 | Muramatsu et al. ... 267/140.14 |
| 6,264,181 | B1 | * | 7/2001 | Muramatsu et al. ... 267/140.14 |
| 6,352,249 | B2 | * | 3/2002 | Muramatsu et al. ... 267/140.14 |
| 6,491,290 | B2 | | 12/2002 | Muramatsu et al. ... 267/140.14 |
| 6,527,260 | B2 | * | 3/2003 | Takeo et al. ........... 267/140.11 |

FOREIGN PATENT DOCUMENTS

| | | | |
|---|---|---|---|
| EP | 0 851 146 A1 | 7/1998 | ............ F16F/13/26 |
| JP | 3-84238 | 4/1991 | |
| JP | 3-157535 | 7/1991 | |
| JP | 10 061715 A | 3/1998 | ............ F16F/13/26 |
| JP | 10-148234 | 6/1998 | |
| JP | 10-184769 | 7/1998 | |
| JP | 10-184770 | 7/1998 | |
| JP | 10-184775 | 7/1998 | |
| JP | 11 006540 A | 1/1999 | ............ F16F/13/26 |
| JP | 11 101297 A | 4/1999 | ............ F16F/13/26 |
| JP | 0936376 A2 | * 8/1999 | |

* cited by examiner

Primary Examiner—Xuan Lan Nguyen
(74) Attorney, Agent, or Firm—Beyer Weaver & Thomas LLP

(57) ABSTRACT

Disclosed is a pneumatically operated active vibration damping device including an elastic oscillating plate partially define a pressure receiving chamber formed on one side thereof and an oscillating air chamber formed on the other side thereof, wherein the elastic oscillating plate is oscillated due to a periodic change of the air pressure generated in the oscillating air chamber so as to exhibit active vibration damping effect of the device, and wherein at least one of the pressure receiving chamber and the oscillating air chamber undergoes a static pressure change so as to change a spring stiffness of the elastic oscillating plate. Thus, the device is capable of changing its active vibration damping characteristics based on the oscillation of the elastic oscillating plate.

19 Claims, 4 Drawing Sheets

PNEUMATICALLY OPERATED ACTIVE VIBRATION DAMPING DEVICE

INCORPORATED BY REFERENCE

The disclosure of Japanese Patent Application NO. 2000-370401 filed on Dec. 5, 2000 including the specification, drawings and abstract is incorporated herein by reference in its entirety.

BACKGROUND OF THE INVENTION

1. Field of the Invention

The present invention relates generally to an active vibration damping device interposed between two members of a vibration system for actively attenuating or reducing vibrations transmitted between the two members, more particularly to a pneumatically operated active vibration damping device capable of changing its vibration damping or isolating characteristics depending upon vibrations to be damped, by utilizing an air pressure change.

2. Description of the Related Art

A known example of the above type of pneumatically operated active vibration damping device is disclosed in JP-A-10-184769. The disclosed active vibration-damping device includes: a first and a second mounting member connectable to the two members of the vibration system, respectively; an elastic body elastically connecting the first and second mounting members; a pressure receiving chamber partially defined by the elastic body to which a vibrational load is applied; an easily deformable flexible diaphragm partially defining an equilibrium chamber whose volume is variable; a first orifice passage permitting fluid communication between pressure receiving and equilibrium chamber; and an elastic oscillating plate member which partially defines the pressure receiving chamber on one of opposite sides thereof and an oscillating air chamber on the other side thereof. The disclosed pneumatically operated vibration damping device is able to exhibit a passive damping effect based on resonance of the fluid which is forced to flow through the first orifice passage between the pressure receiving chamber and the equilibrium chamber upon application of the vibrational load to the pressure received chamber, and an active damping effect based on oscillation of the elastic oscillating plate actively generated upon application of a periodic air pressure change to the oscillating air chamber.

Described in detail, this type of active vibration damping device may be arranged to exhibit a high passive damping effect with respect to low frequency vibrations based on the resonance of the fluid flowing through the first orifice passage, while being arranged to actively offset or isolate high frequency vibrations based on the oscillation of the elastic oscillating plate, for example. For the above-described advantages, this type of vibration damping device has been utilized as vibration-damping devices, such as an engine mount and a body mount of vehicles, which are required to exhibit desired vibration damping effect with respect to a plurality of frequency ranges or over a wide frequency range.

In the active vibration damping device constructed as described above, a sufficient amount of flow of the fluid through the first orifice passage is required to ensure high damping effect of the device with respect to the low frequency vibrations. To meet this requirement, it may be attempted to give the oscillating elastic plate a relatively large spring stiffness, so as to restrict passive elastic deformation of the oscillating elastic plate, thus minimizing fluid pressure absorption in the pressure-receiving chamber due to the passive elastic deformation of the oscillating elastic plate. This arrangement may ensure a relatively large amount of pressure change of the fluid in pressure-receiving chamber upon application of the vibrational load to the pressure-receiving chamber.

However, the large spring stiffness of the oscillating elastic plate may deteriorate oscillation efficiency of the oscillating elastic plate caused by the periodic air pressure change induced in the oscillating air chamber. This makes it difficult to control the fluid pressure in the pressure-receiving chamber with efficiency, leading to deterioration of active vibration isolating effect of the damping device with respect to the high frequency vibrations.

To cope with this problem, the inventors of the present invention has been proposed a modified active vibration damping device disclosed in JP-A-10-184770. The disclosed damping device further includes: a rigid partition member dividing the pressure receiving chamber into two sections, namely a primary fluid chamber partially defined by the elastic body and an auxiliary fluid chamber partially defined by the elastic oscillating plate; and a second orifice passage permitting a fluid communication between the primary and auxiliary fluid chambers and being tuned so that resonance of the fluid flowing through the second orifice passage exhibits a desired vibration isolating effect with respect to high frequency vibrations. In the proposed vibration-damping device, the periodic air pressure change applied to the oscillating air chamber can be efficiently transmitted by utilizing the resonance of the fluid flowing through the second orifice passage, even in the case where the oscillating elastic plate has relatively large spring stiffness. Thus, the proposed active vibration-damping device is able to improve both of a vibration damping effect with respect to the low frequency vibrations based on the resonance of the fluid flowing through the first orifice passage, and a vibration isolating effect based on a fluid pressure control between the primary and auxiliary fluid chambers.

The extensive studies on the proposed active vibration damping device, which were made by the present inventors have revealed that the efficient transmission of the fluid pressure change between the primary and auxiliary fluid chamber owing to the resonance of the fluid flowing through the second orifice passage is just effective with respect to vibrations in a very limited frequency band, and a resistance to flow of the fluid through the second orifice passage tents to be increased when frequencies of the vibrations become higher than the limited frequency band to which the second orifice passage is tuned, resulting in significant deterioration of the pressure transmitting efficiency between the primary and auxiliary fluid chambers upon application of the higher frequency vibrations. Accordingly, the proposed active vibration-damping device still suffers from an inherent problem of deterioration of its vibration damping or isolating effect with respect to the high frequency vibrations.

Due to the above-described increase of the resistance to flow of the fluid through the second orifice passage, the fluid pressure change in the pressure receiving chamber upon application of the high frequency vibrations is never absorbed by the volumetric change of the auxiliary fluid chamber, as well as the equilibrium chamber, leading to a higher dynamic spring constant of the vibration damping device, resulting in deterioration of the passive vibration damping effect of the vibration damping device.

That is, the proposed pneumatically oscillated active vibration damping device disclosed in JP-A-10-184770 is still insufficient to exhibit a sufficiently vibration damping effect with respect to vibrations over a wide frequency range, namely a low frequency range to which the first orifice passage is tuned, a high frequency range to which the second orifice passage is tuned, and a higher frequency range which is higher than the frequency range to which the second orifice passage is tuned.

SUMMARY OF THE INVENTION

It is therefore an object of this invention to provide a pneumatically operated active vibration damping device which is novel in construction, and which is capable of exhibiting an excellent active damping effect with respect to vibrations of a plurality of frequency ranges or over a wide frequency range on the basis of an effective control of a fluid pressure within a pressure receiving chamber owing to an oscillation of an elastic oscillating plate, while assuring a sufficient damping effect with respect to low frequency vibrations on the basis of flows or resonance of the fluid which is forced to flow through a first orifice passage.

The above and/or other objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whose specification and drawings or that may be recognized by those skilled in the art in the light of the disclosure in the whole specification and drawings.

(1) A pneumatically operated active vibration damping device comprising: (a) a first and a second mounting member, which are spaced apart from each other; (b) an elastic body elastically connecting the first and second mounting members and partially defining a pressure-receiving chamber, the pressure-receiving chamber being filled with a non-compressible fluid whose pressure is changed upon application of a vibration to be damped between the first and second mounting members; (c) an easily deformable flexible diaphragm partially defining an equilibrium chamber on one of opposite sides thereof, the equilibrium chamber being filled with the non-compressible fluid and having a volume easily variable; (d) a first orifice passage for permitting a communication between the pressure-receiving chamber and the equilibrium chamber; (e) an elastic oscillating plate partially defining the pressure-receiving chamber on one of opposite sides thereof and an oscillating air chamber on an other one of the opposite sides thereof, the elastic oscillating plate being oscillated by a periodic change of an air pressure generated in the oscillating air chamber, so as to actively generate a change of the fluid pressure in said pressure receiving chamber, for actively damping said vibration to be damped based on the pressure change of the fluid in the pressure receiving chamber, and (f) a static pressure control mechanism adapted to substantially statically change at least one of the fluid pressure in the pressure receiving chamber and the air pressure in the oscillating air chamber, so as to induce a substantially static elastic deformation of the elastic oscillating plate for changing a spring stiffness of the elastic oscillating plate.

In the active vibration damping device constructed according to this mode of the invention, the static pressure control mechanism is operable to induce the substantially static elastic deformation of the elastic oscillating plate, to thereby change the spring stiffness of the elastic oscillating plate by an amount corresponding to an amount of the elastic deformation of the elastic oscillating plate. This arrangement makes it possible to change a natural frequency of a vibration system that includes as one of spring components the elastic oscillating plate which is elastically deformed to cause a pressure change or flows of the fluid in the pressure receiving chamber. Therefore, the present active vibration damping device enables that the elastic oscillating plate is actively or periodically oscillated under two or more alternative conditions where the elastic oscillating plate has different elastic deformation states or different spring stiffness.

That is, the active vibration damping device of this mode of the invention is capable of adjusting the spring stiffness of the elastic oscillating plate based on the substantially static change of the fluid pressure in the pressure receiving chamber and/or the air pressure in the oscillating air chamber, in order to tune the natural frequency of the elastic oscillation of the elastic oscillating plate so as to correspond to the frequencies of the vibrations to be damped. To utilize resonance of the elastic oscillation of the elastic oscillating plate makes it possible to transmit the periodic pressure change induced in the oscillating air chamber to the pressure-receiving chamber with high efficiency, thus assuring the effective control of the fluid pressure in the pressure receiving chamber. Therefore, the active vibration-damping device of this mode is capable of exhibiting an excellent active vibration isolating effect with respect to high frequency vibrations.

Further, the elastic oscillating plate is capable of exhibiting a low spring constant owing to the resonance effect thereof with respect to vibrations of a specific frequency band to which the natural frequency of the elastic oscillating plate is tuned, while exhibiting a large spring stiffness with respect to low frequency vibrations whose frequency band is lower than the specific frequency band. This large spring stiffness of the elastic oscillating plate with respect to the low frequency vibrations ensures that a sufficiently large amount of fluid is forced to flow through the first orifice passage upon application of the low frequency vibrational load to the damping device. Thus, the active vibration-damping device of this mode of the invention permits an excellent passive vibration damping effect with respect to the low frequency vibrations, on the basis of the flows or resonance of the fluid flowing through the first orifice passage.

In this respect, the spring stiffness of the elastic oscillating plate can be changed by applying a suitable level of substantially static pressure to the elastic oscillating plate, making it possible to change the natural frequency of the elastic oscillation of the elastic oscillating plate so as to correspond to a change of the frequency of the vibration to be damped. Thus, the active vibration damping device of this mode of the invention is capable of exhibiting a desired active vibration damping effect with respect to vibrations ranging a plurality of frequency bands or over a wide frequency band, on the basis of the suitably controlled fluid pressure in the pressure receiving chamber, by suitably changing the natural frequency of the elastic oscillation of the elastic oscillating plate according to the frequency of the vibration to be damped.

In this mode of the invention, the substantially static elastic deformation of the elastic oscillating plate should be interpreted to mean an elastic deformation of the elastic oscillating plate which is considered to be substantially constant without taking into account an effect of the active or periodic air pressure change in the oscillating air chamber. For instance, the elastic oscillating plate may be considered to be statically elastically deformed, if an amount of active elastic deformation induced in the elastic oscillating plate is significantly small and is ignorable with respect to the oscillation of the elastic oscillating plate and the vibrational load applied to the device. Further, the term "substantially statically change at least one of the fluid pressure in the pressure receiving chamber and the air pressure in the oscillating air chamber" should be interpreted to mean a static pressure change which is able to generate the static elastic deformation of the elastic oscillating plate in a plurality of different states including an initial state. For instance, the substantially static pressure change may include a higher frequency periodic pressure change which frequency is sufficiently higher than that of the vibrations to be damped and the periodic air pressure change induced in the oscillating air pressure, so as not to cause an elastic deformation or displacement of the elastic oscillating plate. In this case, a level of the substantially static pressure, in other words, the amount of elastic deformation of the elastic oscillating plate may be changed by adjusting a duty ratio of the higher frequency periodic pressure change applied to the pressure receiving chamber and/or the oscillating air chamber. Further, the static elastic deformation of the elastic oscillating plate may be varied gradually or continuously.

(2) A pneumatically operated active vibration damping device according to the above-indicated mode (1), wherein the static pressure control mechanism comprises a static working air chamber partially defined by and formed on an other one of opposite sides of the flexible diaphragm remote from the equilibrium chamber, the static working air chamber being subjected to a static change of an air pressure therein, which is applied to the pressure receiving chamber via the flexible diaphragm, the equilibrium chamber and the first orifice passage, so as to substantially statically change the fluid pressure in the pressure receiving chamber.

In the active vibration damping device of this mode (2) of the invention, the presence of the static working air chamber enables to separate a control system of the static change of the air pressure to be applied to the static working air chamber, from a control system of the periodic change of the air pressure induced in the oscillating air chamber, thus facilitating the control of the static air pressure change to be applied to or to be induced in the static working air chamber. In addition, the static air pressure change induced in the static working air chamber is transmitted to the pressure-receiving chamber through the flexible diaphragm, the equilibrium chamber and the first orifice passage. In this respect, the first orifice passage functions as a filter to prevent or reduce undesirable transmission of high frequency components of the air pressure change induced in the static working air chamber, owing to increase of resistance to flows of the fluid through the first orifice passage with respect to the high frequency components. This makes it possible to eliminate or minimize adverse effects of the application of the static air pressure change to the static working air chamber on a vibration damping effect of the active vibration damping device.

(3) A pneumatically operated active vibration damping device according to the above-indicated mode (1) or (2), wherein the oscillating air chamber being applied with both of the periodic change of the air pressure for actively oscillating the elastic oscillating plate and a substantially static change of an air pressure for inducing the substantially static elastic deformation of the elastic oscillating plate. In this arrangement, both of the periodic air pressure change required for the active damping effect of the device and the static air pressure change required for changing the spring stiffness of the elastic oscillating plate are applied to the oscillating air chamber. This arrangement makes it possible to simplify a structure of an external air piping system usable for applying the periodic and static air pressure changes to the oscillating air chamber.

(4) A pneumatically operated active vibration-damping device according to any one of the above-indicated modes (1)–(3) of the invention, further comprising: (g) a restricting member, wherein the elastic oscillating plate is partially brought into abutting contact with the restricting member so as to increase the spring stiffness thereof, and wherein the static pressure control mechanism is operable to induce the substantially static elastic deformation of the elastic oscillating plate so that the elastic oscillating plate is moved to be contact with and away from the restricting member.

In this mode (4) of the invention, the elastic oscillating plate is brought into abutting contact with the restricting member with a desired amount of contact area so that a desired amount of physical restriction force is applied to the elastic oscillating plate, or so that an amount of free length of the elastic oscillating plate (i.e., an amount of area serving for elastic deformation) is adjusted. Further, the elastic oscillating plate is also moved away from the restricting member. This arrangement enables to change the spring stiffness of the elastic oscillating plate with high stability and efficiency. Preferably, the restricting member may be formed of a material whose rigidity is larger than at least that of the elastic oscillating plate. It may be arranged such that the amount of contact area of the elastic oscillating plate with the restricting member is gradually or continuously increased and/or decreased.

In the pneumatically operated active vibration damping device constructed according to the above-indicated mode (4), it may be possibly arranged such that the contact area of the elastic oscillating plate with the restricting member is increased or decreased from its initial value, as the elastic oscillating plate is statically elastically deformed from its initial state by the static pressure control mechanism. This arrangement may be embodied according to the following mode (5) of the invention.

(5) A pneumatically operated active vibration-damping device according to the above-indicated mode (4), wherein the elastic oscillating plate is partially held in abutting contact with the restricting member at an initial state thereof, and the static pressure control mechanism is operable so as to induce the static elastic deformation of the elastic oscillating plate so that the elastic oscillating plate is moved away from the restricting member. In this arrangement, the elastic oscillating plate is elastically deformed by the static pressure control mechanism in order to reduce the spring stiffness thereof.

(6) A pneumatically operated active vibration damping device according to any one of the above mode (1)–(5), further comprising: (h) a partition member which is adapted to divide the pressure-receiving chamber into a primary fluid chamber partially defined by the elastic body and an auxiliary fluid chamber partially defined by the elastic oscillating plate; and (i) a second orifice passage for fluid communication between the primary fluid chamber and the auxiliary fluid chamber, wherein the elastic oscillating plate being oscillated so as to actively generate a pressure change of the fluid in the auxiliary fluid chamber, which is transmitted to the primary fluid chamber via the second orifice passage.

In this mode (6) of the invention, owing to resonance of the fluid flowing through the second orifice passage, the periodic pressure change of the fluid in the auxiliary fluid chamber induced by the oscillation of the elastic oscillating plate is effectively transmitted to the primary fluid chamber. Therefore, the vibration-damping device constructed according to the preset mode (6) of the invention is able to exhibit the active damping effect with further improved efficiency.

(7) A pneumatically operated active vibration damping device according to the above-indicated mode (6), wherein the device is applied as an engine mount for an automotive vehicle, and wherein the first orifice passage is tuned to a low frequency band corresponding to engine shakes, and the second orifice passage is tuned to a high frequency band corresponding to engine idling vibrations and booming noises. In this arrangement, the active vibration damping device in the form of the engine mount is capable of exhibiting high vibration damping effects with respect to vibrations required to be damped in the vehicle, namely, the low frequency vibrations such as the engine shakes, on the basis of the resonance of the fluid flowing through the first orifice passage, and the high frequency vibrations such as the engine idling vibrations or the booming noises, on the basis of the resonance of the fluid flowing through the second orifice passage.

It should be appreciated that the active vibration damping device constructed according to any one of the above-indicated modes (1)–(7), is also able to exhibit passive damping effect based on the flows or resonance of the fluid which is forced to flow through the first and second orifice passages due to the pressure change of the fluid in the pressure receiving chamber or the primary fluid chamber induced by the elastic deformation of the elastic body upon application of the vibrational load to the device. In this respect, the tuning frequency of the first and second orifice passages can be desirably changed by suitably controlling the spring stiffness of the elastic oscillating plate by means of the static pressure control mechanism. This arrangement permits the active vibration damping device of the invention to exhibit the passive vibration damping effect with respect to vibrations ranging a plurality of frequency ranges or a wide frequency range.

(8) A pneumatically operated active vibration damping device according to the above-indicated mode (7), wherein the static pressure control mechanism is operable to change the spring stiffness of the elastic oscillating plate so that the second orifice passage is selectively tuned to a first frequency band corresponding to the engine idling vibrations and a second frequency band corresponding to the booming noises. In this mode (8) of the invention, the level of the static pressure applied to the elastic oscillating plate may be changed depending upon driving conditions of the vehicle, for example, may be changed based on a control signal applied to the static pressure control mechanism, which represents a driving condition of the vehicle including a running condition and a stationary condition with its engine placed in its idling condition. In this arrangement, the active vibration damping device in the form of the engine mount is able to exhibit excellent active vibration isolating effect with respect to both of the two different high frequency vibrations to be damped, i.e., the engine idling vibrations and the booming noises, by only changing the level of static pressure applied to the elastic oscillating plate.

(9) A pneumatically operated active vibration damping device according to the above-indicated mode (7) or (8), wherein the static pressure control mechanism is operable to apply a static negative pressure to the at least one of the pressure receiving chamber and the oscillating air chamber so that the elastic oscillating plate is elastically deformed in order to reduce the spring stiffness thereof.

In this mode (9) of the invention, the negative pressure available from a vacuum source of an air intake system of the engine of the vehicle may preferably be utilized as a negative pressure source of the static pressure control mechanism. In this mode (9) of the invention, a relatively large negative pressure force (i.e., a negative pressure having a relatively large absolute value) is applied to the elastic oscillating plate upon the stationary condition of the vehicle, resulting in a relatively small spring stiffness of the elastic oscillating plate. On the other hand, a relatively small negative pressure force (i.e., a negative pressure having a relatively small absolute value) is applied to the elastic oscillating plate upon the running condition of the vehicle, resulting in a relatively large spring stiffness of the elastic oscillating plate. Accordingly, the active vibration damping device of this mode (9) of the invention enables to exhibit high active vibration isolating effect with respect to vibrations corresponding to the engine idling vibrations, on the basis of the elastic oscillation of the elastic oscillating plate whose spring stiffness is made lower by the application of the relatively large negative pressure force. The damping device is also capable of exhibiting a high active vibration isolating effect with respect to vibrations corresponding to the booming noises whose frequency is higher than that of the engine idling vibrations, on the basis of the elastic oscillation of the elastic oscillating plate whose spring stiffness is made higher by the application of the relatively small negative pressure force. Thus, the active vibration-damping device of this mode (9) of the invention is capable of controlling its active damping characteristics according to the driving conditions of the vehicle, with ease and efficiency.

(10) A pneumatically operated active vibration damping device according to any one of the above-indicated modes (1)–(9), further comprising: (j) an active pressure regulating switch valve which is operable for selectively connect the oscillating air chamber to a vacuum source and an atmosphere, wherein the active pressure regulating switch valve is operated to alternately connect the oscillating air chamber to the vacuum source and the atmosphere at a frequency corresponding to that of a vibration to be damped, and wherein a switching operation of the active pressure regulating switch valve is controlled according to a control signal whose duty ratio is adjusted corresponding to vibrations to be damped such that a ratio of a time of connection of the oscillating air chamber to the vacuum source is adjusted so as to apply the periodic change of the air pressure to the oscillating air chamber to thereby oscillate the elastic oscillating plate corresponding to the vibration to be damped.

In this mode (10), the oscillation of the elastic oscillating plate caused by the application the periodic air pressure change to the oscillating air chamber is easily and accurately controlled so as to correspond to vibration to be damped, by suitably regulating a duty ratio of the control signal for controlling the switching operation of the active pressure regulating switch valve. This ensuring further improved active vibration damping effect of the device. It should be appreciated that the above-mentioned regulation of the duty ratio of the control signal according to this mode of the invention is effective for the active oscillation of the elastic oscillating plate, but not necessarily effective to provide functions of the static pressure control mechanism, namely, is not necessarily effective to induce the substantially static elastic deformation of said elastic oscillating plate.

(11) A pneumatically operated active vibration damping device according to the above-indicated mode (10), wherein the damping device is applied as an engine mount, and wherein the control signal applied to the active pressure regulating switch valve has a frequency substantially equal to that of an engine ignition pulse signal, and a phase of the control signal with respect to the engine ignition pulse signal is adjusted according to an engine speed. In this mode (11) of the invention, the oscillation of the elastic oscillating plate is controlled on the basis of the engine ignition pulse signal as a reference signal, which has a high co-relationship with the vibration of the engine, while the phase of the air pressure change applied to the elastic oscillating plate is controlled so as to correspond to the engine speed. This arrangement permits a high sophisticated control of the fluid pressure in the pressure-receiving chamber corresponding to conditions of vibrations generated by the rotation of the engine. Thus, the active vibration-damping device of this mode (11) of the invention can exhibit further improved vibration damping characteristics with respect to engine idling vibrations and the booming noises.

(12) A pneumatically operated active vibration damping device according to the above-indicated modes (2)–(10), wherein the second mounting member has a cylindrical cup shape and is open to the first mounting member with a spacing therebetween, such that an open end portion of the second mounting member is fluid-tightly closed by the elastic body interposed between and elastically connecting the first and second mounting members, wherein the second mounting member supports a partition structure press-fitted into a cylindrical interior portion thereof, the partition structure cooperating with the elastic body to form the pressure receiving chamber on one of opposite sides thereof, and including an integrally formed restricting member adapted to support the elastic oscillating plate and cooperate with the elastic oscillating plate to form therebetween the oscillating air chamber, wherein the second mounting member supports the flexible diaphragm so as to be located between the partition member and a bottom surface of the second mounting member, the flexible diaphragm cooperating with the partition member to form said equilibrium chamber on one of opposite sides thereof, while cooperating with the bottom surface to form a fluid tightly enclosed static working air chamber on an other one of the opposite sides thereof, the static working air chamber undergoing a static change of an air pressure therein, which is applied to the pressure receiving chamber via the flexible diaphragm, the equilibrium chamber and the first orifice passage, so as to substantially statically change the fluid pressure in the pressure receiving chamber.

This mode (12) of the invention makes it possible to effectively provide the pneumatically operated active vibration damping device of the invention which is made simple in construction, and which includes a large number of components such as the pressure receiving chamber, the equilibrium chamber, the first orifice passage, the oscillating air chamber, the static pressure working air chamber, suitably arranged within the cylindrical portion of the second mounting member with high space utilization.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
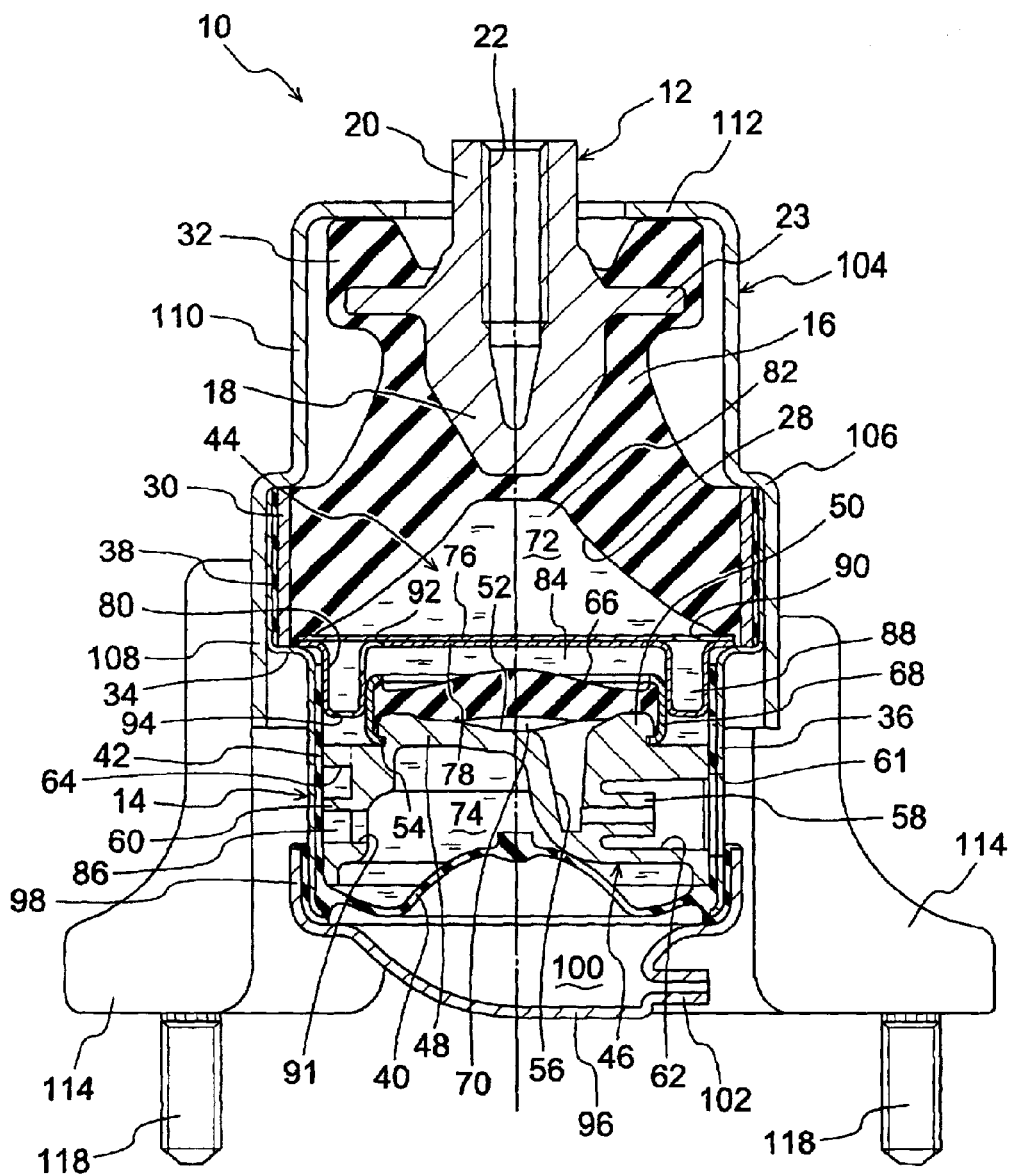
FIG. 1 is an elevational view in axial or vertical cross section of a pneumatically operated active vibration-damping device in the form of an engine mount for an automotive vehicle, which is constructed according to one preferred embodiment of the invention.

Referring first to FIG. 1, there is shown an engine mount 10 for an automotive vehicle, as one embodiment of a pneumatically operated active vibration-damping device of the present invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material and fixed thereto upon vulcanization of the rubber material for forming the elastic body 16. The first and second mounting members 12, 14 are adapted to be attached to a power unit 26 (see FIG. 2) and a body 130 (see FIG. 2) of the motor vehicle, respectively, so that the power unit, which includes an engine, is mounted on the vehicle body in a vibration damping and/or isolating fashion. With this engine mount 10 installed on the vehicle as described above, the elastic body 16 is held elastically compressed with the weight of the power unit acting on the engine mount 10 in the vertical direction as seen in FIG. 1. The engine mount receives a vibrational load primarily in the vertical direction in which the first and second support members are opposed to and spaced apart from each other.

The first mounting member 12 includes a body portion 18 having an inverted generally frusto-conical shape, and a threaded mounting portion 20 which is formed integrally with the body portion 18 so as to extend axially upwardly from the large-diameter end of the body portion 18. The threaded mounting portion 20 has a tapped hole 22 open in its upper end face and extending in its axial direction. The first mounting member 12 further includes a stop portion 23 having an annular plate-like shape, which is formed integrally with the body portion 18 at its large-diameter end, so as to extend radially outwardly from the outer circumferential surface of the body portion 18. The first mounting member 12 is fixedly attached to the power unit 26 of the vehicle by a fastening bolt 24 threaded into the tapped hole 22 of the threaded mounting portion 20.

The elastic body 16 has a generally frusto-conical shape having a relatively large diameter and formed with a large diameter recess 28 open in its large diameter end face. The elastic body 16 is bonded to the first mounting member 12 in the above-indicated vulcanization process such that the elastic body 16 and the first mounting member 12 are disposed in a substantially concentric or coaxial relationship with each other, and such that the body portion 18 of the first mounting member 12 is embedded in the small-diameter end portion of the elastic body 16. To the outer circumferential surface of the large-diameter end portion of the elastic body 16, there is bonded a generally cylindrical large-diameter metallic sleeve 30 in the above-indicated vulcanization process. Thus, an integral vulcanized assembly consisting of the first mounting member 12, the elastic body 16 and connecting metal member 30 is formed. On the stop portion 23 of the first mounting member 12, there is formed a rubber buffer 32 integrally formed with the elastic body 16 such that the rubber buffer 32 extends in the axially upward direction from the stop portion 23.

The second mounting member 14 consists of a generally cylindrical metallic member having a relatively large diameter. The second mounting member 14 includes an axially intermediate shoulder portion 34, an axially lower small-diameter portion 36 located on the lower side of the shoulder portion 34, and an axially upper large-diameter portion 38 located on the upper side of the shoulder portion 34. In an axially lower open end portion of the second mounting member 14, an easily deformable flexible diaphragm 40 is disposed with a slack, so as to extend in a radial direction perpendicular to an axial direction of the second mounting member 14. The flexible diaphragm 40 is bonded at its peripheral portion to the lower open-end portion of the second mounting member 14 upon vulcanization of a rubber material for forming the flexible diaphragm 40, thus fluid tightly closing the lower open-end portion of the second mounting member 14. The inner circumferential surfaces of the small-diameter and large-diameter portions 36, 38 are substantially entirely covered by a thin sealing rubber layer 42 secured thereto upon vulcanization of a rubber material for forming the sealing rubber layer 42.

The second mounting member 14 is fixed to the large-diameter end portion of the elastic body 16, with its upper large-diameter portion 38 being press-fitted on the metallic sleeve 30 by a suitable method, for example, by pressing or by a drawing operation to press the large-diameter portion 38 onto the metallic sleeve 30 in the radially inward direction. In the presence of the sealing rubber layer 42 which is compressed between the large-diameter portion 38 and the metallic sleeve 30, an axially upper open-end portion of the second mounting member 14 is fluid-tightly fixed to and closed by the elastic body 16. In this condition, the first and second mounting members 12, 14 are disposed in a concentric or coaxial relationship with each other and spaced apart from each other in an axial direction thereof substantially parallel to the vertical direction, while being elastically connected to each other by the elastic body 16 interposed therebetween.

That is, the second mounting member 14, elastic body 16 and flexible diaphragm 40 cooperate with each other to define a fluid-tightly enclosed fluid chamber 44 filled with a suitable non-compressible fluid. The non-compressible fluid in the fluid chamber 44 is not particularly limited, and may be preferably selected from among water, alkylene glycol, polyalkylene glycol and silicone oil, for instance. For the engine mount 10 to exhibit a sufficiently high vibration damping effect based on flows of the non-compressible fluid, it is desirable to use a non-compressible fluid whose viscosity is not higher than 0.1.

The present engine mount 10 further includes a partition member in the form of a partition structure 46 disposed or accommodated within the small-diameter portion 36 of the second mounting member 14. The partition structure 46 is a generally thick-walled inverted cup shaped metallic member. The partition structure 46 includes a restricting member in the form of a generally circular central projection 50 integrally formed at its upper wall portion 48 so as to extend axially upwardly. The central projection 50 has a round recess 52 open in its upper end face, and an engaging groove 54 which is open in a circumferential surface of its base portion, and which extends in a circumferential direction of the central projection 50. The partition structure 46 further includes a pressure transmitting passage 56 open in the radially inner portion of the upper end face of the central projection 50, and extending in the axially downward direction. This pressure transmitting passage 56 is held in communication at its lower end portion with an external area via a port 58 integrally formed within a side recessed portion open in an outer circumferential surface of a cylindrical wall portion 60 of the partition structure 46. The port 58 has a tubular-shaped protruding end portion which is accommodated within the side-recessed portion 62 and protrudes radially outwardly from a bottom wall portion of the side-recessed portion 62.

The small-diameter portion 36 of the second mounting member 14 has a through hole 61 at a portion corresponding to the side recessed portion 62 of the partition structure 46, so that the side recessed portion 62 is open to the external area through the through hole 61. This makes it possible to connect an external conduit to the port 58 so that the pressure transmitting passage 56 is held in communication with the external conduit.

The partition structure 46 is also provided with a circumferential groove 64 open in its outer circumferential surface of the cylindrical wall portion 60 and extending back-and forth in a circumferential direction thereof or extending spirally in an axial direction thereof. The circumferential groove 64 is open at one end thereof in an outer circumferential portion of the upper wall portion 48 of the partition structure 46, and at the other end thereof in an inner circumferential surface of the cylindrical wall portion 60 of the partition structure 46.

The thus formed partition structure 46 functions to support at its central portion 50 an elastic oscillating plate in the form of a rubber elastic plate 66. Described in detail, the rubber elastic plate 66 is a generally disk-like shaped member made of a rubber material, whose thickness is gradually increased in a radially inward direction thereof so that a radially central portion of the rubber elastic plate 66 slightly protrudes axially outwardly (axially upwardly as seen in FIG. 1) in axially both sides of the rubber elastic plate 66. The thus formed rubber elastic plate 66 is bonded at its peripheral portion to an inner circumferential surface of an engaging metallic sleeve 68 in the process of vulcanization of the rubber material to form the rubber elastic plate 66. With the rubber elastic plate 66 being placed on the upper end face of the central projection 50, an axially lower end portion of the engaging metallic sleeve 68 is disposed radially outwardly on the outer circumferential surface of the central projection 50, and bent radially inwardly at its lower end so as to be fluid-tightly engaged with the engaging groove 54 and calked against the central projection 50 of the partition structure 46. In this condition, the peripheral portion of the rubber elastic plate 66 is secured to an outer circumferential portion of the central protrusion 50 while assuring a fluid-tight sealing between these portions over their entire circumference. With the rubber elastic plate 66 disposed in the central projection 50 as described above, an outer circumferential portion of the lower surface of the rubber elastic plate 66 is held in close contact with the upper end face of the central projection 50 owing to the elasticity of the rubber elastic plate 66, while a central portion of the lower surface of the rubber elastic plate 66 is spaced apart from a bottom surface of the recess 52 in the upper end face of the central projection 50 with an axial spacing therebetween. That is, the rubber elastic plate 66 and the recess 52 cooperate to define therebetween a fluid-tightly enclosed oscillating air chamber 70 which is held in communication with the pressure transmitting passage 56.

The partition structure 46 is accommodated within and forcedly fixed into the small-diameter portion 36 of the second mounting member 14 via the sealing rubber 42 compressed therebetween. The partition structure 46 provided as described above functions to divide the fluid chamber 44 into two axially opposite sections, i.e., a pressure receiving chamber 72 formed on its upper side and partially defined by the elastic body 16, and an equilibrium chamber 74 formed on its lower side and partially defined by the flexible diaphragm 40.

The second mounting member 14 also supports a partition plate 76 and an orifice defining member 78 which are both disposed within the large diameter portion 38 of the second mounting member 14 so as to extend in the radial direction of the second mounting member 14. Described in detail, the partition plate 76 is a thin-disk shaped metallic member, and is superposed at its outer circumferential portion on the shoulder portion 34 of the second mounting member 14. On the other hand, the orifice-defining member 78 is a generally thin-disk shaped metallic member having an annular groove 80 integrally formed in an outer circumferential portion so as to extend in its circumferential direction over its entire circumference and so as to be open in its axially upper surface. This orifice-defining member 78 is superposed on an lower surface of the partition plate 76 so that an outer circumferential portion of the orifice-defining member 78 is superposed on the shoulder portion 34 together with the outer circumferential portion of the partition plate 76. These outer circumferential portions of the partition plate 76 and the orifice-defining member 78 are forcedly compressed by and between the shoulder portion 34 and the outer circumferential portion of the elastic body 16 with a fluid-tight sealing therebetween, so that the partition plate 76 and the orifice-defining member 78 are fixedly supported by the second mounting member 14. In this condition, the partition plate 76 and the orifice-defining member 78 fluid-tightly superposed on each other, while the orifice-defining member 78 is fluid-tightly fitted at an inner cylindrical wall portion of the annular groove 80 onto an outer circumferential surface of the engaging metallic sleeve 68 fixed to the peripheral portion of the rubber elastic plate 66. In other words, the rubber elastic plate 66 is fluid-tightly fixed at its peripheral portion thereof to the inner cylindrical wall portion of the annular groove 80 of the orifice-defining member 78.

With the partition plate 78 and the orifice defining member 78 being assembled within the second mounting member 14 as described above, the pressure receiving chamber 72 is fluid-tightly divided into two sections, i.e., a primary fluid chamber 82 formed on the upper side of the partition plate 78 and partially defined by the elastic body 16, and an auxiliary fluid chamber 84 formed on the lower side of the orifice defining member 78 and partially defined by the rubber elastic plate 66. It should be understood that the partition plate 76 and the orifice-defining member 78 cooperate to serve as a partition member in the present embodiment.

Further, an opening of the circumferential groove 64 formed in the outer circumferential surface of the partition structure 46 is fluid-tightly closed by the inner circumferential surface of the small-diameter portion 36 with the sealing rubber layer 42 compressed therebetween, to thereby provide a first orifice passage 86. The first orifice passage 86 is held in communication at one of axially opposite end thereof with the equilibrium chamber 74 through a communication hole 91 formed through the cylindrical wall portion 60 of the partition structure 46, and at the other end thereof with the primary and auxiliary fluid chambers 82, 84 through the communication holes 90, 92, 94 formed through the partition plate 76 and the orifice defining member 78. Thus, the first orifice passage 86 permits a fluid communication between the primary and auxiliary fluid chambers 82, 84 and the equilibrium chamber 74. On the other hand, an opening of the annular groove 80 formed in the orifice-defining member 78 is fluid-tightly closed by the partition plate 76 to thereby define therebetween a second orifice passage 88. The second orifice passage 88 is held in communication at one of opposite ends thereof with the primary fluid chamber 82 through the communication hole 90 formed through the partition plate 76, and at the other end thereof with the auxiliary fluid chamber through the communication hole 92 formed through the inner circumferential wall portion of the orifice defining member 78. Thus, the second orifice passage 88 permits a fluid communication between the primary and auxiliary fluid chambers 82, 84. In this respect, the second orifice passage 88 is circumferentially extending between the communication holes 90, 92 with a predetermined circumferential length.

Upon application of the vibrational load to the engine mount 10 constructed as described above, a fluid pressure within the primary fluid chamber 82 is directly changed due to the elastic deformation of the elastic body 16. The fluid pressure change induced in the primary fluid chamber 82 is transmitted to the auxiliary fluid chamber 84 by the fluid forced to flow through the second orifice passage 88 between the primary and auxiliary fluid chambers 82, 84. The flexible diaphragm 40 is likely to be deformed to permit a volumetric change of the equilibrium chamber 74, making it possible to absorbs or reduces a pressure change in the equilibrium chamber 74. When the fluid pressures within the primary and auxiliary fluid chambers 82, 84 vary due to the elastic deformation of the elastic body 16 upon application of the vibrational load to the engine mount 10, the fluid is forced to flow through the first orifice passage 86 between the primary and auxiliary fluid chambers 82, 84 and the equilibrium chamber 74 due to the pressure difference between the primary and auxiliary fluid chambers 82, 84 and the equilibrium chamber 74. Likewise, the auxiliary fluid chamber 84 is partially defined by the rubber elastic plate 66 which is elastically deformed so as to absorb or reduce a predetermined amount of change of the fluid pressure within the auxiliary fluid chamber 84. This arrangement generates a pressure difference between the primary and auxiliary fluid chambers 82, 84, causing flows of the fluid through the second orifice passage 88 between the primary fluid chamber 82 and the auxiliary fluid chamber 84.

In the present embodiment, the first orifice passage 86 is tuned so as to exhibit a desired vibration damping effect on the basis of resonance of the fluid flowing therethrough, with respect to a low frequency band, which is lower than a specific frequency band to which the second orifice passage 88 is tuned. To this end, the first orifice passage 86 has the ratio "A/L" of cross-section area "A" to length "L", which is made smaller than that of the second orifice passage 88 so that a value of resistance to flow of the fluid through the first orifice passage 86 is made larger than large than a value of resistance to flow of the fluid through the second orifice passage 88. Further, the auxiliary fluid chamber 84 partially defined by the rubber elastic plate 66 has a spring stiffness of the wall which is made larger than that of the equilibrium chamber 74 partially defined by the flexible diaphragm 40, and accordingly permits a volumetric change thereof the amount of which is made smaller than that of the equilibrium chamber 74. Therefore, the engine mount 10 of the present embodiment is likely to excite flows of the fluid flowing through the second orifice passage 88 exhibiting a relatively low resistance to flow of the fluid flowing therethrough, upon application of high-frequency and small-amplitude vibrations such as engine idling vibrations and booming noises, while being likely to excite flows of the fluid flowing through the first orifice passage 86 exhibiting a relatively high resistance to flow of the fluid flowing therethrough, upon application of low-frequency and large-amplitude vibrations such as engine shakes.

In this respect, the first orifice passage 86 is tuned to a low frequency band corresponding to that of the vibrations such as the engine shakes, while the second orifice passage 88 is tune to a high frequency band corresponding to that of the engine idling vibrations and the booming noises. Thus, the engine mount 10 of this embodiment is capable of exhibiting a desired vibration damping effect with respect to the low frequency vibrations such as the engine shakes, while exhibiting a desired vibration isolating effect with respect to the high frequency vibrations such as the engine idling vibrations or the booming noises.

The lower open end portion of the second mounting member 14 is closed by a bottom cover member 96 having a generally shallow-cup shape and made of metal. The bottom cover member 96 is fixed to the lower open end portion of the second mounting member 14, with its cylindrical fixing open-end portion 98 being press-fitted on the lower open end portion of the second mounting member 14 by pressing, a drawing operation or the like. A sealing rubber layer secured to the outer circumferential surface of the lower end portion of the second mounting member is compressed by and between the cylindrical fixing open-end portion 98 of the bottom cover member 96 and the lower end portion of the second mounting member 14, for thereby assuring a fluid-tight sealing therebetween.

The bottom cover member 96 closing the lower open end portion of the second mounting member 14 functions to protect the diaphragm 40 and cooperate with the diaphragm 40 to define therebetween a static working air chamber 100 which is fluid-tightly enclosed from the external area. The bottom cover member 96 has a tube shaped port 102 integrally formed at and open in a bottom wall portion thereof. Thus, the static working air chamber 100 is connectable to a suitable external conduit via the port 102.

In the engine mount 10 constructed according to the present embodiment, a mounting bracket 104 is fixed to the outer circumferential surface of the second mounting member 14. The mounting bracket 104 has a generally large-diameter cylindrical shape and includes an axially intermediate shoulder portion 106, an axially lower large-diameter cylindrical portion 108 located on the lower side of the shoulder portion 106, and an axially upper small-diameter cylindrical portion 110 located on the upper side of the shoulder portion 106. On the outer circumferential surface of the large-diameter cylindrical portion 108, a plurality of mounting legs 114 are fixed by welding at respective circumferential portions, so as to extend axially downwardly as seen in FIG. 1. Each of the mounting legs 118 has a fixing bolt 118 secured at and extending axially downwardly from a bottom end portion thereof. The mounting bracket 104 further includes an abutting portion 112 integrally formed at an open-end portion of the small-diameter cylindrical portion 110 of the mounting bracket 104, so as to extend radially inwardly.

The mounting bracket 104 constructed as described above is fixedly mounted on the engine mount 10 with the large-diameter cylindrical portion 108 being press-fitted on the large-diameter portion 38 of the second mounting member 14, by pressing, a drawing process or the like. With the mounting bracket 104 assembled with the engine mount 10 as described above, the shoulder portion 106 of the mounting bracket 104 is held in abutting contact with the upper end face of the second mounting member 14, and the abutting portion 112 of the mounting bracket 104 is opposed to the stop portion 23 of the first mounting member 12 in the axial direction of the engine mount 10 with the rubber buffer 32 interposed therebetween.

Figure 2:
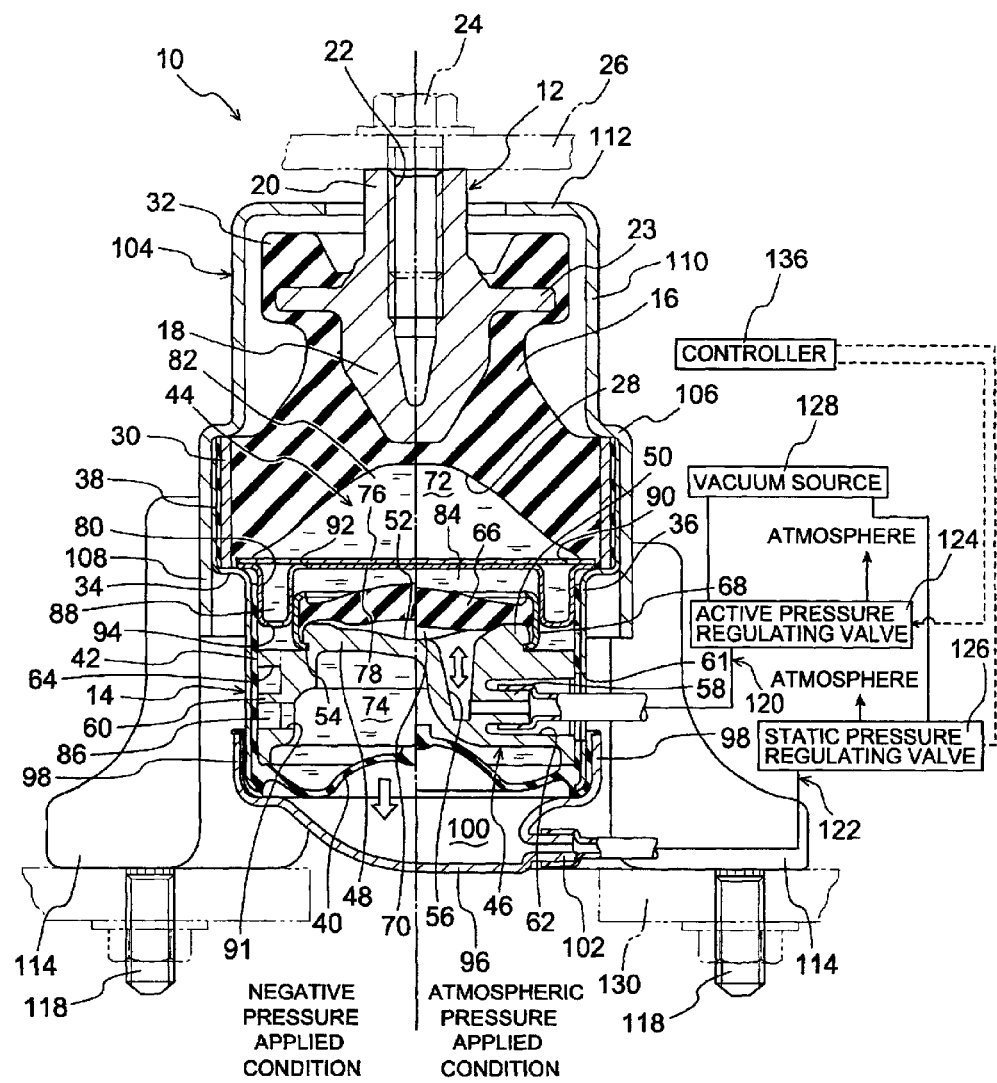
FIG. 2 is an elevational view in axial or vertical cross section of the engine mount of FIG. 1, showing one operation mode of the engine mount installed on the vehicle.

The engine mount 10 constructed according to the present embodiment as described above is installed on the vehicle as shown in FIG. 2. Namely, the second mounting member 14 is fixed to the body 130 of the vehicle with the leg portions 114 of the mounting bracket 104 being placed on and fixed by fixing bolt 118 to the body 130 of the vehicle, while the power unit 26 including the engine of the vehicle is mounted on and fixed by the fastening bolt 24 to the first mounting member 12. Thus, the power unit 26 is mounted on the body 130 of the vehicle in a vibration damping and/or isolating fashion, in the presence of the engine mount 10 interposed therebetween.

With the engine mount 10 installed in position as shown in FIG. 2, the elastic body 16 undergoes an elastic compression in the axial direction of the engine mount 10, due to a static load or weight of the power unit acting thereon, so that the first and second mounting members 12, 14 are moved toward each other in the axial direction. In this condition, the rubber buffer 32 provided on the stop potion 23 of the first mounting member 12 is opposed to and is spaced apart from the abutting part 112 of the bracket 104 in the axial direction, in which the weight of the power unit is applied downwardly to the engine mount 10, and a rebound load is applied upwardly. Upon application of the rebound load to the engine mount 10, the stop portion 23 is brought into cushion-like abutting contact with the abutting portion 112 via the rubber buffer 32, thus limiting the distance of the displacement of the elastic body 16 in the redound direction in which the first and second mounting members are spaced apart from each other. It will be understood that the stop portion 23, the rubber buffer 32 and the abutting portion 112 cooperate to constitute a stop mechanism for limiting the relative displacement of the first and second mounting members 12, 14 in the rebound direction in a shock absorbing manner.

In the engine mount 10 constructed according to the present embodiment, a first air conduit 120 is connected to the port 58 held in communication with the oscillating air chamber 70, and a second air conduit 122 is connected to the port 102 held in communication with the static working air chamber 100. The first air conduit 120 includes an active-pressure-regulating-switch valve 124 which is connected to the first air conduit 120 and which is operable for alternately connection of the oscillating air chamber 70 to an atmosphere and a vacuum source 128. That is, a switching operation of the active-pressure-regulating switch valve 124 is controllable so as to selectively apply an atmospheric pressure in the atmosphere and a negative pressure in the vacuum source 128 to the oscillating air chamber 70. The vacuum source 128 may be constituted by utilizing negative pressure generated in an air-intake system of an internal combustion engine of the power unit 26. For the active and static pressure regulating switch valves 124, 126, it may be preferable to use a spool valve, a poppet valve, a rotary valve and any other known valve, particularly, a solenoid-operated valve in view of its high controllability. For enabling a stable supply of the negative pressure, it may be preferably to use an accumulator for accumulating the negative pressure available from the air-intake system of the engine as the vacuum source 128, for example.

On the other hand, the second conduit 122 includes a static-pressure-regulating switch valve 126 which is connected to the second air conduit 122 and which is operable for alternately connection of the static working air chamber 100 to an atmosphere and a vacuum source 128. That is, a switching operation of the static-pressure-regulating switch valve 126 is controlled so as to selectively apply an atmospheric pressure in the atmosphere and a negative pressure in the vacuum source 128 to the static working air 100.

The engine mount 10 constructed as described above operates under control of a controller 136. Described in detail, the controller 136 is adapted to control switching operations of the active and static pressure-regulating switch valves 124, 126, so as to correspond to vibrations to be damped. The controller 136 may include a computer incorporating a central processing unit (CPU) which is equipped with a read-only memory (ROM) storing various control programs, a random-access memory (RAM) for temporarily storing data use by the CPU, and input and output interfaces. To the CPU, there are connected a data map memory, switch valve drivers including amplifiers for driving the respective active and static pressure-regulating switch valves 124, 126, for example. The controller 136 is adapted to receive various kinds of control signals such as an engine ignition pulse signal, a vehicle speed signal, an engine speed signal and an acceleration signal. Based on the received control signals, the CPU of the controller 136 generates drive signals as a first and second control signals to be applied to the active and static pressure regulating switch valves 124, 126 via the switch valve drivers so that the active and static pressure-regulating switch valves 124, 126 are desirably operated for assuring desired vibration damping effects of the engine mount 10.

There will be described in detail one example of a control manner of the operation of the engine mount 10 of the present embodiment. First, the CPU of the controller 136 determines a current driving condition of the vehicle. For instance, the CPU determines whether the vehicle is in a running condition or a stationary condition in which the vehicle is stationary with its engine placed in its idling condition, on the basis of the vehicle speed signal. If the vehicle is in the running condition, the CPU of the controller 136 applies a first static drive signal to the static pressure regulating switch valve 126 so that the static pressure regulating switch valve 126 is held in its first operating position in which the static working air chamber 100 is connected to the atmosphere, so as to keep the air pressure in the static working air chamber 100 in the atmospheric pressure level. If the vehicle is in the stationary condition, the CPU of the controller 136 applies a second static drive signal to the static-pressure-regulating switch valve 126 so that the static-pressure-regulating-switch valve 126 is held in its second operating position in which the static working air chamber 100 is connected to the vacuum source 128 so as to keep the air pressure in the static working air chamber 100 in a predetermined negative pressure level.

Figure 3:
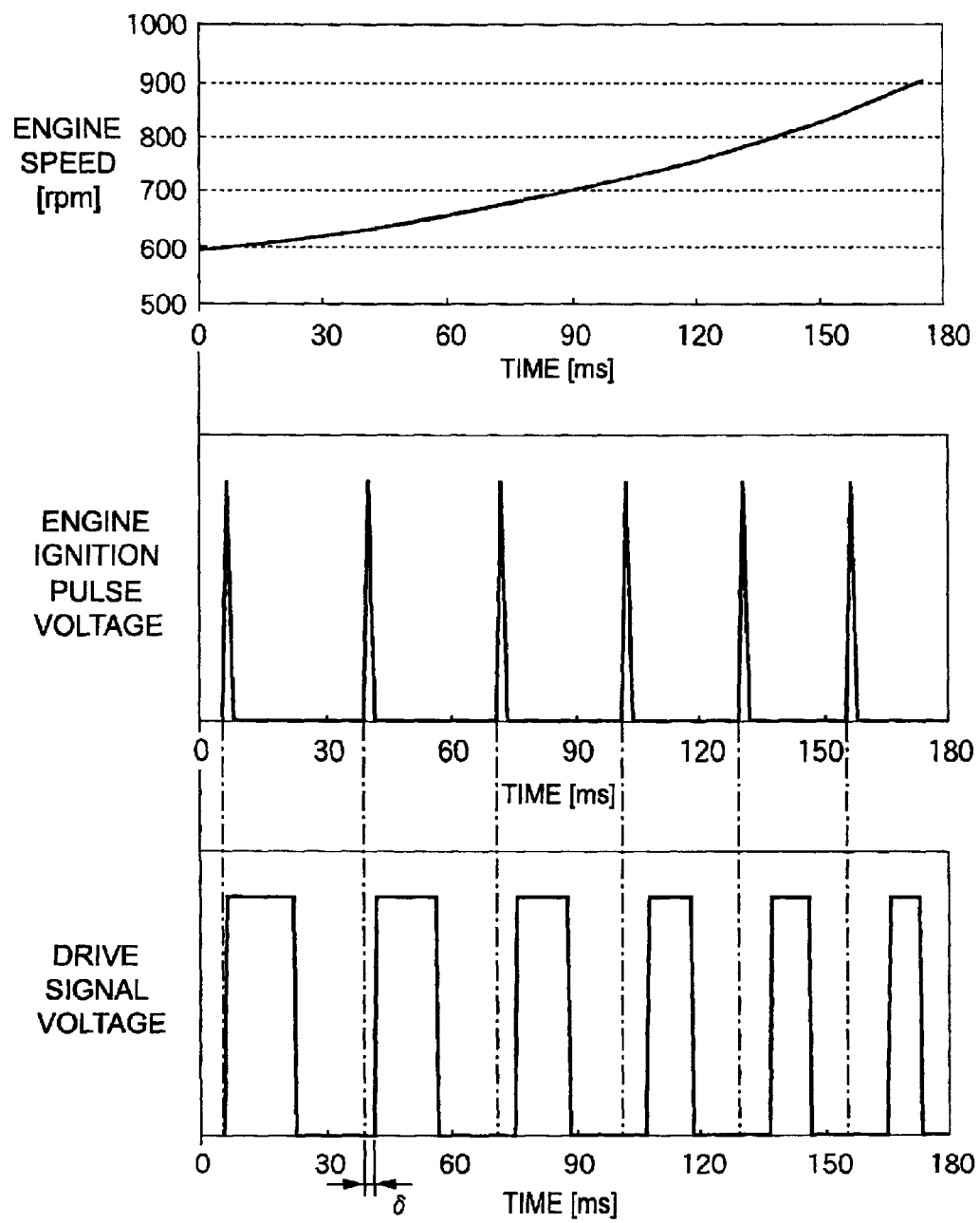
FIG. 3 is a timing chart illustrating one example of the manner of control of operation of the engine mount of FIG. 2.

Further, the CPU of the controller 136 reads the engine ignition pulse signal used as a reference signal and the engine speed signal used as a compensation signal, and then obtains an active drive signal to be applied to the active-pressure-regulating switch valve 124, according to a predetermined calculation program stored in advance in the ROM of the controller, on the basis of the engine ignition pulse signal and the engine speed signal, or alternatively based on date maps representing predetermined relationships between the active drive signals, and the engine ignition pulse signal and the engine speed signal, which are stored in advance in the ROM of the controller 136. As shown in FIG. 3, the obtained drive signal has a frequency equal to that of the engine ignition pulse signal and a phase with respect to the engine ignition pulse signal, which is adjusted corresponding to the engine speed, by way of example. The CPU of the controller 136 applies the obtained active drive signal to the active-pressure-regulating switch valve 124, so that a suitably controlled periodic change of the air pressure is applied to the oscillating air chamber 70. As well known in the art, vibrations transmitted from the engine of the vehicle has a magnitude (amplitude) that decreases as the engine speed increases, in general. In view of this, a ratio of a time of connection of the active pressure regulating switch valve 124 to the vacuum source 128 in the entire period of the switching operation of the active pressure regulating switch valve 124 (i.e., a duty ratio) decreases as the engine speed increases, as shown in the graph of FIG. 3. Namely, a suitable regulation of the duty ratio of the active pressure regulating switch valve 124 makes it possible to change an amplitude of the periodic change of the air pressure in the oscillating air chamber 70 so as to correspond to the magnitude of the vibration to be damped which is changed according to the engine speed.

In the engine mount 10 operated under control of the controller 136, when the vehicle is in the running condition, the static working air chamber 100 is open to the atmosphere, as shown in the right-hand half of FIG. 2. This operating condition of the engine mount 10 is hereinafter referred to as "an atmospheric pressure applied condition". That is, when the engine mount 10 in the atmospheric pressure applied condition is in its initial state where no vibrational load is applied thereto, the primary chamber 82, the auxiliary fluid chamber 84 and the equilibrium chamber 74 are exposed to a substantially atmospheric pressure. When the engine mount 10 of the atmospheric-pressure applied condition undergoes an application of the low-frequency large-amplitude vibrations, such as engine shakes, a pressure difference between the primary and auxiliary fluid chambers 82, 84 is induced due to the elastic deformation of the elastic body 16, thus causing flows of the fluid through the first orifice passage 86 between the two chambers 82, 84. Since the first orifice passage 86 is tuned to exhibit high vibration damping effect based on the resonance of the fluid flowing therethrough, with respect to the low frequency vibrations such as the engine shakes. Thus, the engine mount 10 in the atmospheric pressure applied condition is able to exhibit high vibration damping effect with respect to the low frequency vibrations based on the flows of the fluid through the first orifice passage 86.

During this running condition of the vehicle, the active-pressure-regulating switch valve 124 is operated to generate the periodic change of an air pressure in the oscillating air chamber 70, which is substantially synchronous with the engine ignition pulse signal. The generated periodic change of the air pressure in the oscillating air chamber 70 directly acts on the rubber elastic plate 66, thus causing oscillating displacement of a central portion of the rubber elastic plate 66 other than the peripheral portion which is forcedly held in contact with a peripheral portion of the recess 52. This oscillating displacement of the central portion of the rubber elastic plate 66 actively induces the periodic change of the fluid in the auxiliary fluid chamber 84, thus causing the flows of the fluid through the second orifice passage 88 due to the pressure difference between the primary and auxiliary fluid chambers 82, 84. Therefore, the pressure of the fluid in the primary fluid chamber 82 is suitably controlled by transmitting the periodic pressure change of the fluid in the auxiliary fluid chamber 84 to the primary fluid chamber 82 via the flow of the fluid through the second orifice passage. It should be appreciated that the engine mount 10 of the present embodiment is arranged such that, when the atmospheric pressure is applied to the static working air chamber 100 and the rubber elastic plate 66 is held in contact with its peripheral portion with the peripheral portion of the recess 52, while being spaced apart from the recess 52 and being elastically deformable at its central portion, as shown in the right-hand half of FIG. 2, the second orifice passage 88 exhibits a high pressure transmitting efficiency upon application of vibrations whose frequency band corresponds to that of the booming noise based on the resonance of the fluid flowing through the second orifice passage 88. Thus, the engine mount 10 of the present embodiment is capable of exhibiting an excellent active vibration damping or isolating effect based on the efficient and accurate pressure control of the primary fluid chamber 82.

On the other hand, when the vehicle is in the stationary condition, the static working air chamber 100 is connected to the vacuum source 128, and a predetermined negative pressure generated in the static working air chamber 100 is applied to the primary and auxiliary fluid chambers 82, 84 via the equilibrium chamber 74, the first and second orifice passages 86, 88, as shown in the left-hand half of FIG. 2. This operation condition of the engine mount 10 is hereinafter referred to as "a negative-pressure applied condition". When the engine mount 10 in the negative-pressure applied condition is in its initial state where no vibrational load is applied thereto, the primary chamber 82, the auxiliary fluid chamber 84 and the equilibrium chamber 74 exposed to the predetermined constant negative pressure. In this condition, the constant negative pressure applied to the auxiliary fluid chamber 84 is acts on the entire area of the upper surface of the rubber elastic plate 66, so that the rubber elastic plate 66 is displaced axially upwardly so as to be spaced apart from the recess 52 over the entire area thereof, based on the pressure difference between the constant negative pressure applied to its upper surface and the atmospheric pressure applied to its lower surface. This arrangement ensures an increase of a free length of the rubber elastic plate 66, in other words, an increase of an area serving for the elastic deformation thereof, in comparison with the case where the static working air chamber 100 is open to the atmosphere, thus increasing a degree of freedom on the elastic deformation of the rubber elastic plate 66. As a result, the frequency characteristic of the second orifice passage 88 is changed such that the resonance of the fluid flowing through the second orifice passage 88 is excited with respect to a frequency band which is lower than the corresponding frequency band in the case where the static working air chamber 100 is open to the atmosphere.

Therefore, the application of the constant negative pressure to the static working air chamber 100 enables the engine mount 10 to exhibit an excellent pressure transmitting efficiency between the primary and auxiliary fluid chambers 82, 84, based on the resonance of the fluid flowing through the second orifice passage 88, upon application of one kind of high frequency vibrations, such as the engine idling vibrations whose frequency band is lower than that of the booming noises and is higher than that of the engine shakes. Thus, the engine mount 10 is capable of exhibiting a high active vibration isolating effect with respect to the engine idling vibrations excited during the stationary condition of the vehicle, based on the desirably controlled fluid pressure in the primary fluid chamber 82 owing to the excellent fluid pressure transition between the primary and auxiliary fluid chambers 82, 84.

In this respect, a level of the negative pressure generated in the air-intake system of the internal conversion engine is made larger during the stationary condition of the vehicle where the engine is placed in its idling condition rather than the running condition of the vehicle. Thus, the engine mount 10 of the present embodiment is able to change its vibration damping or isolating characteristics with high stability and efficiency, by effectively utilizing the relatively large negative pressure force generated in the air-intake system during the stationary condition of the vehicle. As is understood from the foregoing description, the static working air chamber 100, the flexible diaphragm 40, the equilibrium chamber 74, the first orifice passage 86 cooperate to constitute a static pressure control mechanism, in the present embodiment.

Figure 4:
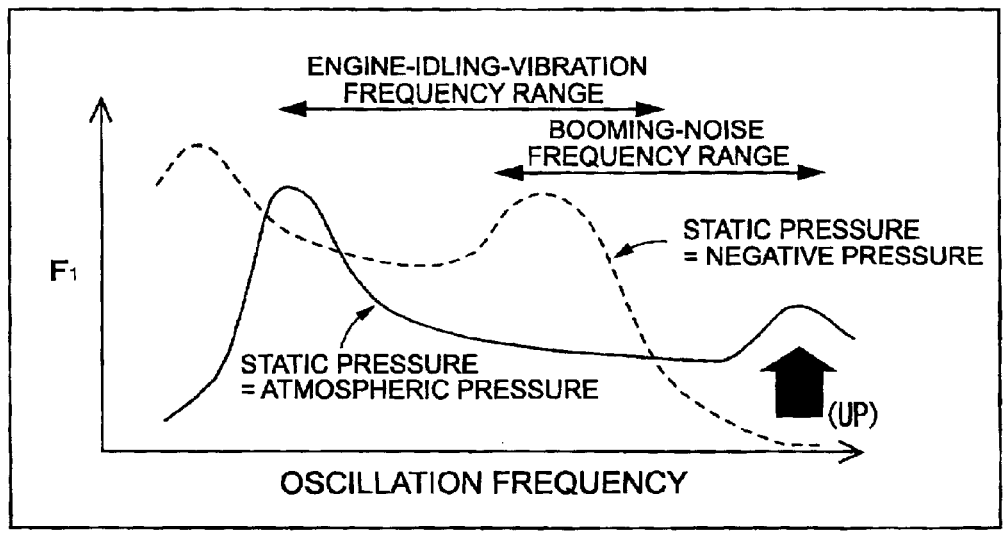
FIG. 4 is a graph showing frequency characteristics of an active vibration damping effect of the engine mount of FIG. 1 when an elastic oscillating plate is under active control by using a periodic air pressure change.

The engine mount 10 constructed according to the present embodiment was actually operated under control of the controller 136, with the static working air chamber 100 open to the atmosphere, as shown in the right-hand half of FIG. 2, and with the static working air chamber 100 connected to the vacuum source 128. In both cases, the periodic change of the air pressure is applied to the oscillating air chamber 70, and oscillating forces: $F_1$ generated in the axial direction of the engine mount 10 between the first and second mounting members 12, 14 were measured. The measurements are indicated in the graph of FIG. 4. In this respect, the frequency of the periodic change of the air pressure applied to the oscillating air chamber 70 is gradually increased from the low frequency bend to the high frequency band, like a sweep oscillation, so that frequency characteristics of the generated oscillating forces $F_1$ are also Indicated in the graph of FIG. 4.

As is apparent from the graph of FIG. 4, the engine mount 10 in the atmospheric pressure applied condition, is able to excite a sufficiently large oscillating force: $F_1$ in the high frequency range corresponding to the booming noises, thus assuring an excellent vibration isolating effect with respect to the high frequency vibrations, like the booming noises. On the other hand, the engine mount 10 in the negative pressure applied condition is able to excite a sufficiently large oscillating force: $F_1$ in a frequency range corresponding to the engine idling vibrations and lower than the frequency range of the booming noises, thus assuring an excellent vibration isolating effect with respect to the vibrations corresponding to the engine idling vibrations.

Figure 5:
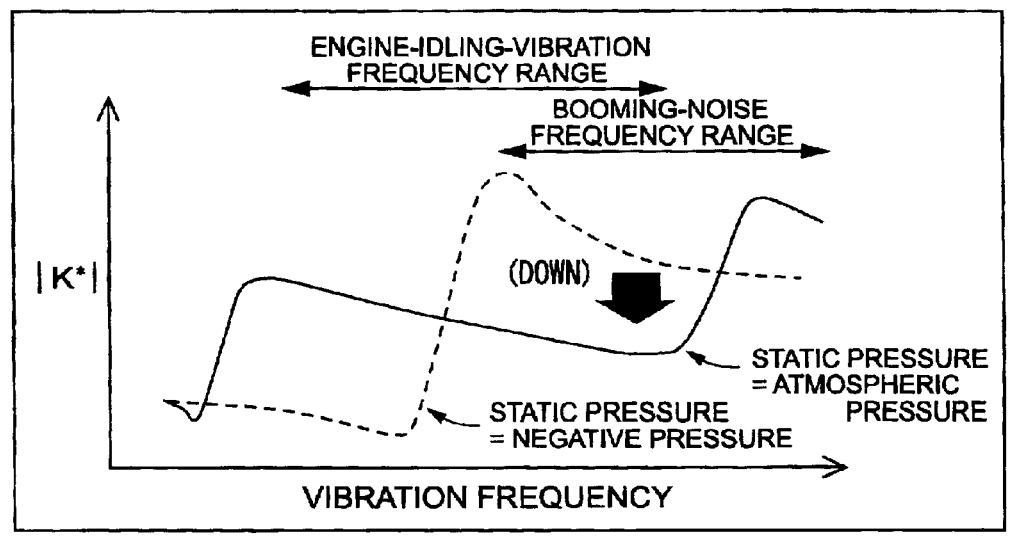
FIG. 5 is a graph showing frequency characteristics of an passive vibration damping effect of the engine mount of FIG. 1 when the elastic oscillating plate is under passive control by using a static air pressure change.

It is also appreciated that the engine mount 10 of the present embodiment is able to change the tuning frequency characteristics of the second orifice passage 88 by changing the spring stiffness of the rubber elastic plate 66 by suitably regulating the pressure of the air within the static working air chamber 100. This arrangement enables the engine mount 10 to change frequency characteristics of its passive vibration damping effects which is exhibited on the basis of the resonance of the fluid flowing through the second orifice passage 88 with the oscillating air chamber 70 being applied with a static air pressure. The engine mount 10 is operated with its oscillating air chamber 70 open to the atmosphere and with the static working air chamber 100 open to the atmosphere. The engine mount 10 was also actually operated with its oscillating air chamber 70 connected to the atmosphere and with the static working air chamber 100 connected to the vacuum source 128. In both cases, frequency characteristics of absolute values of complex spring constants: |K*| of the engine mount 10 were measured as passive vibration isolating characteristics of the engine mount 10. The measurements are indicated in the graph of FIG. 5. As is apparent from FIG. 5, the engine mount 10 exhibits a passive vibration isolating effect with respect to the high frequency band corresponding to the booming noises, when the static working air chamber 100 is open to the atmosphere, and exhibits a high passive vibration isolating effect with respect to the frequency band corresponding to the engine idling vibration, when the static working air chamber 100 is connected to the vacuum source 128. Thus, the engine mount 10 is capable of exhibiting an excellent passive vibration isolating effect owing to the resonance of the fluid flowing through the second orifice passage 88 with respect to the different high frequency range.

While the presently preferred embodiment of this invention have been described above for illustrative purpose only, it is to be understood that the present invention is not limited to the details of the illustrated embodiments, but may be otherwise embodied.

While the static working air chamber 100 to be applied with the static air pressure change and the oscillating air chamber 70 to be applied with the periodic air pressure change are formed independent of each other in the illustrated embodiment, it may be possible to apply both of the static air pressure change and the periodic air pressure change to the oscillating air chamber 70, thus eliminating the use of the static working air chamber 100.

In the illustrated embodiments, the atmosphere and the negative pressure in the air intake system of the engine are employed as two different air pressure sources. The present invention does not limited to the illustrated embodiments, and may be embodied so as to utilize any other two or more pressure sources whose values of pressure are different from each other. For instance, the combination of atmospheric pressure and a positive pressure having a pressure value higher than that of the atmospheric pressure may be employed.

Described more specifically, the illustrated engine mount 10 may be modified such that the static working air chamber 100 is alternately connected to the atmosphere and a suitable positive pressure source, while the oscillating air chamber 70 is alternately connected to the atmosphere and a suitable negative pressure source, by way of example. In this case, the rubber elastic plate 66 is arranged to be spaced apart from the recess 52 in its initial position, and the rubber elastic plate 66 is elastically deformed to be held in abutting contact at its peripheral portion with the peripheral portion of the recess 52, when the static working air chamber 100 is connected to the positive air source and/or the oscillating air chamber 70 is connected to the negative pressure source, for example.

The air pressure within the oscillating air chamber 70 can be desirably controlled, but not limited to the manner of the illustrated embodiment. For instance, it may be possible to control the oscillating force generated between the first and second mounting member 12, 14 may be controlled in a feedback control manner, on the basis of an actual pressure value of the fluid within the primary fluid chamber 82 detected by a suitable pressure sensor, or alternatively on the basis of an actual vibrational load applied to the body 130 of the vehicle detected by a suitable acceleration sensor.

In the illustrated embodiment, the static working air chamber 100 is selectively connected to the vacuum source 128 and the atmosphere via the static pressure regulating switch valve 126, so that air pressures of two different values are alternately applied to the static working air chamber 100 depending upon driving condition of the vehicle. A variety of static pressure controls in the static working air chamber 100 become practical by employing a duty ratio control of the switching operation of the static pressure regulating switch valve 126. More specifically described, the static pressure regulating switch valve 126 is operated based on a control signal applied thereto so as to alternately connected the static working air chamber 100 to the vacuum source 128 and the atmosphere at a high frequency which is higher than a frequency of said vibration to be damped and which is higher enough to induce the substantially static elastic deformation of the elastic oscillating plate. Simultaneously, a duty ratio of the control signal is adjusted according to the frequency of the vibration to be damped so that a ratio of a time of connection of the static working air chamber 100 to the vacuum source 128 in a switching operation of the static pressure regulating switch valve 126 (i.e., in one cycle of the switching operation) is changed, whereby the air pressure of the static working air chamber 100 is substantially statically changed among three or more predetermined different pressure values, or optional values selected from continuously changing values. In those cases, the spring stiffness of the elastic oscillating plate 66 is substantially statically changed among the three or more different values, or the optional values.

In the illustrated embodiments, the present invention is applied to one type of the engine mount wherein the first and second mounting members 12, 14 are opposite to each other with a suitable amount of spacing, in one direction, e.g., a vertical direction. The present invention may be applicable to other types of the engine mounts, for instance, to a fluid-filled type engine mount for a FF (front-engine/front-drive) motor vehicle, as disclosed in JP-A-3-157535, which includes an inner sleeve member as a first mounting member and an outer sleeve member as a second mounting member disposed radially outwardly of the inner sleeve member, that are elastically connected with each other by an elastic body interposed therebetween. In addition, the principle of the present invention is applicable not only an engine mount for mounting an engine of an automotive vehicle on the vehicle body in a vibration damping fashion, but also other fluid-filled type vibration damping devices for automotive vehicles, such as body mounts, and differential mounts, and various kinds of fluid-filled vibration damping devices for various devices or equipment other than the automotive vehicles.

It is also to be understood that the present invention may be embodied with various other changes, modification sand improvements, which may occur to those skilled in the art, without departing from the spirit and scope of the invention defined in the following claims.

What is claimed is:

1. A pneumatically operated active vibration damping device comprising:
    a first and a second mounting member, which are spaced apart from each other;
    an elastic body elastically connecting said first and second mounting members and partially defining a pressure-receiving chamber, said pressure-receiving chamber being filled with a non-compressible fluid whose pressure is changed upon application of a vibration to be damped between said first and second mounting members;

an easily deformable flexible diaphragm partially defining an equilibrium chamber on one of opposite sides thereof, said equilibrium chamber being filled with said non-compressible fluid and having a volume easily variable;

a first orifice passage for fluid communication between said pressure-receiving chamber and said equilibrium chamber;

an elastic oscillating plate partially defining said pressure-receiving chamber on one of opposite sides thereof and an oscillating air chamber on an other one of said opposite sides thereof, said elastic oscillating plate being oscillated by a periodic change of an air pressure generated in said oscillating air chamber, so as to actively generate a change of a fluid pressure in said pressure receiving chamber, for actively damping said vibration to be damped based on said change of said fluid pressure in the pressure receiving chamber, and a static pressure control mechanism adapted to substantially statically change said fluid pressure in said pressure receiving chamber, so as to induce a substantially static elastic deformation of said elastic oscillating plate for changing a spring stiffness of said elastic oscillating plate.

2. A pneumatically operated active vibration damping device according to claim 1, wherein said oscillating air chamber is applied with said periodic change of said air pressure whose frequency is corresponding to a frequency of said vibration to be damped, while said static pressure control mechanism is operated to substantially statically change said fluid pressure in said pressure receiving chamber so as to adjust said spring stiffness of said elastic oscillating plate such that a value of a natural frequency of said elastic oscillating plate increases as a value of said frequency of said vibration to be damped increases.

3. A pneumatically operated active vibration damping device, according to claim 1, wherein said static pressure control mechanism comprises a static working air chamber partially defined by and formed on an other one of opposite sides of said flexible diaphragm remote from said equilibrium chamber, said static working air chamber undergoing a static change of an air pressure therein, which is applied to said pressure receiving chamber via said flexible diaphragm, said equilibrium chamber and said first orifice passage, so as to substantially statically change said fluid pressure in said pressure receiving chamber.

4. A pneumatically operated active vibration damping device according to claim 3, further comprising a static pressure regulating switch valve operable based on a control signal applied thereto for selective connection of said static working air chamber to an external vacuum source and an atmosphere, wherein said static pressure regulating switch valve is operated to alternately connect said static working air chamber to said vacuum source and said atmosphere at a high frequency which is higher than a frequency of said vibration to be damped and which is high enough to induce said substantially static elastic deformation of said elastic oscillating plate, and wherein a duty ratio of said control signal is adjusted according to said frequency of said vibration to be damped so that a ratio of a time of connection of said static working air chamber to said vacuum source in a switching operation of said static pressure regulating switch valve is changed, to thereby substantially statically change said spring stiffness of said elastic oscillating plate.

5. A pneumatically operated active vibration damping device according to claim 1, wherein said oscillating air chamber being applied with both of said periodic change of said air pressure for actively oscillating said elastic oscillating plate and a substantially static change of an air pressure for inducing said substantially static elastic deformation of said elastic oscillating plate.

6. A pneumatically operated active vibration damping device according to claim 3, further comprising an active pressure regulating switch valve operable based on a first control signal applied thereto for selective connection of said oscillating air chamber to an external vacuum source and an atmosphere, and an static pressure regulating switch valve operable based on a second control signal applied thereto for selective connection of said static working air chamber to said vacuum source and said atmosphere, wherein said active pressure regulating switch valve is operated to alternately connect said oscillating air chamber to said vacuum source and said atmosphere at a frequency corresponding to a frequency of said vibration to be damped, and a duty ratio of said first control signal is adjusted according to an amplitude of said vibration to be damped so that a ratio of a time of connection of said oscillating air chamber to said vacuum source in a switching operation of said active pressure regulating switch valve is changed, to thereby generate said periodic change of said air pressure in said oscillating air chamber, while said static pressure regulating switch valve is operated to alternately connect said static working air chamber to said vacuum source and said atmosphere at a high frequency which is higher than a frequency of said vibration to be damped and which is high enough to induce said substantially static elastic deformation of said elastic oscillating plate, and a duty ratio of said second control signal is adjusted according to said frequency of said vibration to be damped so that a ratio of a time of connection of said static working air chamber to said vacuum source in a switching operation of said static pressure regulating switch valve is changed, to thereby substantially statically change said spring stiffness of said elastic oscillating plate.

7. A pneumatically operated active vibration-damping device according to claim 1, further comprising:

a restricting member, wherein said elastic oscillating plate is partially brought into abutting contact with said restricting member in a static state thereof so as to increase said spring stiffness thereof, and wherein said elastic oscillating plate is moved away from said restricting member when the static pressure control mechanism is operated to substantially statically change said fluid pressure in said pressure receiving chamber.

8. A pneumatically operated active vibration damping device according to claim 1, further comprising:

a partition member which is adapted to divide said pressure-receiving chamber into a primary fluid chamber partially defined by said elastic body and an auxiliary fluid chamber partially defined by said elastic oscillating plate; and a second orifice passage for fluid communication between said primary fluid chamber and said auxiliary fluid chamber, wherein said elastic oscillating plate being oscillated so as to actively generate a pressure change of the fluid in said auxiliary fluid chamber, which is transmitted to said primary fluid chamber via said second orifice passage.

9. A pneumatically operated active vibration damping device according to claim 8, wherein said elastic oscillating plate is fluid-tightly fixed at an peripheral portion thereof to said partition member so that said auxiliary fluid chamber is defined by and between said elastic oscillating plate and said partition member, and said second orifice passage is disposed radially outwardly of said peripheral portion of said elastic oscillating plate.

10. A pneumatically operated active vibration damping device according to claim 8, wherein said device is applied as an engine mount for an automotive vehicle, and
   wherein said first orifice passage is tuned to a low frequency band corresponding to engine shakes, and said second orifice passage is tuned to a high frequency band corresponding to engine idling vibrations and booming noises.

11. A pneumatically operated active vibration damping device according to claim 10, wherein said static pressure control mechanism is operable to change said spring stiffness of said elastic oscillating plate so that said second orifice passage is selectively tuned to a first frequency band corresponding to said engine idling vibrations and a second frequency band corresponding to said booming noises.

12. A pneumatically operated active vibration damping device according to claim 10, wherein said static pressure control mechanism is operable to apply a static negative pressure to said pressure receiving chamber so that said elastic oscillating plate is elastically deformed in order to reduce said spring stiffness thereof.

13. A pneumatically operated active vibration damping device according to claim 1, further comprising:
   an active pressure regulating switch valve which is operable for selectively connect said oscillating air chamber to a vacuum source and an atmosphere,
   wherein said active pressure regulating switch valve is operated to alternately connect said oscillating air chamber to said vacuum source and said atmosphere at a frequency corresponding to a frequency of said vibration to be damped, and
   wherein a switching operation of said active pressure regulating switch valve is controlled according to a first control signal whose duty ratio is adjusted according to said vibration to be damped so that a ratio of a time of connection of said oscillating air chamber to said vacuum source is adjusted so as to apply said periodic change of said air pressure to said oscillating air chamber to thereby oscillate said elastic oscillating plate corresponding to said vibration to be damped.

14. A pneumatically operated active vibration damping device according to claim 13, wherein said device is applied as an engine mount, and
   wherein said first control signal applied to said active pressure regulating switch valve has a frequency substantially equal to that of an engine ignition pulse signal, and a phase of said first control signal with respect to said engine ignition pulse signal is adjusted according to an engine speed.

15. A pneumatically operated active vibration damping device according to claim 1, wherein said second mounting member has a cylindrical cup shape and is open to said first mounting member with a spacing therebetween, such that an open end portion of said second mounting member is fluid-tightly closed by said elastic body interposed between and elastically connecting said first and second mounting members,
   wherein said second mounting member supports a partition structure press-fitted into a cylindrical interior portion thereof, said partition structure cooperating with said elastic body to form said pressure receiving chamber on one of opposite sides thereof, and including an integrally formed restricting member adapted to support said elastic oscillating plate and cooperate with said elastic oscillating plate to form therebetween said oscillating air chamber, and
   wherein said second mounting member supports said flexible diaphragm so as to be located between said partition structure and a bottom surface of said second mounting member, said flexible diaphragm cooperating with said partition structure to form said equilibrium chamber on one of opposite sides thereof, while cooperating with said bottom surface to form a fluid tightly enclosed static working air chamber on an other one of said opposite sides thereof, said static working air chamber undergoing a static change of an air pressure therein, which is applied to said pressure receiving chamber via said flexible diaphragm, said equilibrium chamber and said first orifice passage, so as to substantially statically change said fluid pressure in said pressure receiving chamber.

16. A pneumatically operated active vibration damping device according to claim 15, wherein said partition structure serves for defining said first orifice passage at an outer circumferential portion thereof.

17. A pneumatically operated active vibration damping device according to claim 15, wherein said partition structure has a pressure transmitting passage, which is open at one of opposite ends thereof to said oscillating air chamber defined between said integrally formed restricting member thereof and the elastic oscillating plate and at an other one of said opposite ends thereof in an port connectable to an external air source.

18. A pneumatically operated active vibration damping device according to claim 3, wherein said device is applied as an engine mount for an automotive vehicle, said device further comprising:
   a first and a second air conduits connected to said oscillating air chamber and said static working air chamber, respectively;
   an active pressure regulating switch valve which is connected to said first air conduit and which is operable for selective connection of said oscillating air chamber to an external vacuum source and an atmosphere;
   a static pressure regulating switch valve which is connected to said second air conduit and which is operable for selective connection of said static working air chamber to said vacuum source and said atmosphere; and
   a controller adapted to control switching operation of said active and static pressure regulating switch valves, on the basis of said driving condition of said vehicle,
   wherein said controller controls said switching operation of said active pressure regulating switch valve such that said oscillating air chamber is alternately connected to said vacuum source and said atmosphere, at a frequency and phase corresponding to those of vibration to be damped, and
   wherein said controller controls said switching operation of said static pressure regulating switch valve such that said static working air chamber is connected to said atmosphere upon a running condition of said vehicle, and to said vacuum source upon a stationary condition of said vehicle.

19. A pneumatically operated active vibration damping device according to claim 18, wherein said controller receives an engine ignition pulse signal and an engine speed signal, and applies a first control signal to said active pressure regulating switch valve, said drive signal has a frequency substantially equal to that of said engine ignition pulse signal, and a phase of said control signal with respect to said engine ignition pulse signal is adjusted according to said engine speed signal.

* * * * *